Patented Dec. 8, 1936

2,063,680

UNITED STATES PATENT OFFICE 2,063,680

PROCESS FOR THE RECOVERY OF ACETYLENE FROM GAS MIXTURES

Robert M. Isham, Okmulgee, Okla., assignor to Danciger Oil & Refineries, Inc., Tulsa, Okla.

No Drawing. Application April 12, 1935, Serial No. 15,927

7 Claims. (Cl. 260—170)

This invention relates to a process for the separation and recovery of acetylene from mixtures of gases containing acetylene together with hydrogen, methane, carbon monoxide, carbon dioxide, nitrogen, oxygen, ethylene, ethane and other hydrocarbon gases, or other gases.

It has long been known that various oxygen containing solvents, such as acetone, acetaldehyde, and the like have a marked solvent power for acetylene.

For the recovery of acetylene from gas mixtures, it has been proposed to use the selective solvent action of high boiling esters and ethers of polyhydric alcohols, such as glycol and glycerol. It has also been proposed to use the esters of polybasic acids, such as oxalic acid or the like.

These substances, which contain relatively large proportions of oxygen in the molecule, and which are of relatively high boiling point are fairly good selective solvents for acetylene. However, they are of comparatively large molecular weight and consequently the solubility of acetylene in them is not so great, per unit volume, as its solubility in acetone and acetaldehyde.

I have discovered that the aliphatic lactones, such as butyrolactone and valerolactone, which have high boiling points and relatively small molecular weights and contain a relatively large proportion of oxygen, are better solvents for acetylene than the above mentioned esters. Thus butyrolactone dissolves 15 times its volume of acetylene, at 27° C., and proportionally more at lower temperatures. Furthermore, these aliphatic lactones are comparatively poor solvents for the other gases which are present in such gas mixtures as are described above. At 27° C., the solubilities of a number of these gases, per unit volume of butyrolactone, are as follows: methane, 0.558; hydrogen, 0.655; carbon monoxide, 0.722; nitrogen, 0.328. Solubilities of these gases in valerolactone and other aliphatic lactones are entirely similar to their solubility in butyrolactone. In consequence, these lactones may be used to great advantage in concentrating the acetylene contained in gas mixtures resulting from the treatment of methane or other hydrocarbons by exposure to the electric arc, or by partial combustion, or the like.

In a typical embodiment of the process, a gas resulting from partial combustion of natural gas with air at 1250° C., which contained 4.4%, by volume, of acetylene, was subjected to countercurrent scrubbing, in a bubble tray absorber, with butyrolactone, at a pressure of 200 lbs., per square inch. The gas leaving the top of the absorber contained no acetylene. By releasing the pressure on the butyrolactone leaving the bottom of the absorber, and heating it, a gas mixture was recovered containing 58.4%, by volume of acetylene. When this enriched gas mixture was again subjected to selective absorption by butyrolactone, in the same manner, a product was obtained containing 97.5%, by volume, of acetylene.

A gaseous product containing 8.0% acetylene, 4.1% methane and 87.9% hydrogen, obtained by the action of an electric arc on a mixture of natural gas and hydrogen, yielded an enriched product containing 66.8%, by volume, of acetylene, by extraction with gamma valerolactone, and a second treatment of the enriched product raised the acetylene content of the final product to 97.8% by volume.

These lactones may be used as selective solvents for acetylene singly, or in mixture with one another, or mixed with other substances.

The enriched products of extraction may be used as such for cutting and welding purposes, or may be employed in various chemical syntheses, replacing acetylene produced from calcium carbide.

I claim:

1. In the separation and recovery of acetylene from a mixture of gases including acetylene, the step of treating said mixture with an aliphatic lactone as a selective solvent.

2. In the separation and recovery of acetylene from gas mixtures produced by subjecting hydrocarbon gases to partial combustion, the step of treating said mixtures with an aliphatic lactone as a selective solvent.

3. In the separation and recovery of acetylene from gas mixtures produced by subjecting hydrocarbon gases to the action of an electric arc, the step of treating said mixtures with an aliphatic lactone as a selective solvent.

4. In the separation and recovery of acetylene from mixtures of gases including acetylene, the step of treating said mixtures with butyrolactone as a selective solvent.

5. In the separation and recovery of acetylene from mixtures of gases including acetylene, the step of treating said mixtures with gamma valerolactone as a selective solvent.

6. In the separation and recovery of acetylene from mixtures of gases including acetylene, the step of treating said mixtures with a mixture of aliphatic lactones as a selective solvent.

7. In the separation and recovery of acetylene from mixtures of gases including acetylene, the step of selectively absorbing acetylene from said mixtures with solvent mixtures containing aliphatic lactones.

ROBERT M. ISHAM.